(12) United States Patent
Sugiyama

(10) Patent No.: US 10,127,907 B2
(45) Date of Patent: Nov. 13, 2018

(54) CONTROL DEVICE AND MESSAGE OUTPUT CONTROL SYSTEM

(71) Applicant: Sharp Kabushiki Kaisha, Sakai, Osaka (JP)

(72) Inventor: Juri Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/306,819

(22) PCT Filed: Apr. 8, 2015

(86) PCT No.: PCT/JP2015/060973
§ 371 (c)(1),
(2) Date: Oct. 26, 2016

(87) PCT Pub. No.: WO2015/174172
PCT Pub. Date: Nov. 19, 2015

(65) Prior Publication Data
US 2017/0125017 A1 May 4, 2017

(30) Foreign Application Priority Data
May 13, 2014 (JP) .................................. 2014-099730

(51) Int. Cl.
*G10L 15/22* (2006.01)
*G10L 13/047* (2013.01)
(Continued)

(52) U.S. Cl.
CPC ............ *G10L 15/22* (2013.01); *B25J 11/0005* (2013.01); *G10L 13/047* (2013.01); *G10L 13/08* (2013.01); *G10L 15/08* (2013.01); *G10L 15/30* (2013.01); *G10L 17/005* (2013.01); *G10L 17/22* (2013.01); *G10L 2015/088* (2013.01); *G10L 2015/221* (2013.01)

(58) Field of Classification Search
USPC ................................. 704/246, 247, 251, 252
See application file for complete search history.

(56) References Cited

U.S. PATENT DOCUMENTS

| 2007/0107039 A1* | 5/2007 | Miyakawa | ......... H04N 21/4334 725/142 |
| 2009/0305645 A1* | 12/2009 | Watanabe | ............... H04W 4/12 455/73 |

(Continued)

FOREIGN PATENT DOCUMENTS

JP 2005-3747 A 1/2005

*Primary Examiner* — Leonard Saint Cyr
(74) *Attorney, Agent, or Firm* — Keating & Bennett, LLP

(57) ABSTRACT

The present invention prevents a plurality of robots from outputting identical messages to a single user. The present invention includes a message determining section (83) that determines whether or not a message to be outputted from a robot (2) is identical to a first message to be outputted from a robot (1) or a second message which has been outputted from the robot (1). In a case where the message to be outputted from the robot (2) is identical to the first message or the second message, the message determining section (83) controls the robot (2) to (i) output a message different from the first message or the second message, or (ii) not to output any message.

4 Claims, 6 Drawing Sheets

(51) Int. Cl.
  *G10L 13/08* (2013.01)
  *B25J 11/00* (2006.01)
  *G10L 15/08* (2006.01)
  *G10L 15/30* (2013.01)
  *G10L 17/00* (2013.01)
  *G10L 17/22* (2013.01)

(56) References Cited

U.S. PATENT DOCUMENTS

2012/0246744 A1* 9/2012 Kagawa ................. G06F 21/10
  726/32
2013/0007222 A1* 1/2013 Ichie ....................... H04L 69/08
  709/219

* cited by examiner

FIG. 3

| Utterance content | Message | Priority level | |
|---|---|---|---|
| QA | A1 | T1 | High |
|  | A2 | T2 | ↑ |
|  | A3 | T3 |  |
|  | A4 | T4 | ↓ |
|  | ⋮ | ⋮ | Low |
| QB | B1 |  |  |
|  | B2 |  |  |
|  | B3 |  |  |
|  | B4 |  |  |
|  | ⋮ |  |  |

CONTROL DEVICE AND MESSAGE OUTPUT CONTROL SYSTEM

TECHNICAL FIELD

The present invention relates to a control device and a message output control system each controlling messages to be outputted from output devices to a user.

BACKGROUND ART

There has conventionally been known an interactive robot that communicates with a user by providing messages by voices, characters, or the like. It is desirable that such an interactive robot provides an optimal response message in response to, for example, a question given by the user. There have been developed various techniques each allowing an interactive robot to optimally respond to a user. For example, Patent Literature 1 discloses a technique in which (i) an interactive robot catches a voice from a user and transmits the voice to a computer and (ii) the computer determines a responding sentence, which corresponds to the voice, to be outputted to the user.

CITATION LIST

Patent Literature

[Patent Literature 1]
Japanese Patent Application Publication, Tokukai, No. 2005-3747 (Publication date: Jan. 6, 2005)

SUMMARY OF INVENTION

Technical Problem

According to the above conventional technique, in a case where a user interacts with a plurality of robots, all of the plurality of robots may provide identical messages to the user. This is because (i) the plurality of robots catch a single voice from a single user and (ii) identical computers determine identical response sentences corresponding to the single voice to be outputted to the single user. It is of course undesirable that the plurality of robots output identical responses to the single user. Note that this kind of problem will be caused not only by interactive robots but also by general output devices that output messages to the user.

The present invention is attained in view of the above problem. An object of the present invention is to provide a control device and a message output control system each of which can prevent a plurality of output devices from outputting identical messages to a single user.

Solution to Problem

In order to attain the above object, a control device in accordance with an aspect of the present invention controls a plurality of output devices to output messages, the plurality of output devices including a first output device and a second output device, the control device including: a determining section that determines whether or not a message to be outputted from the first output device is identical to a first message to be outputted from the second output device or a second message which has been outputted from the second output device; and a control section that controls the first output device to (i) output a message different from the first message or the second message or (ii) not output any message, in a case where the determining section has determined that the message to be outputted from the first output device is identical to the first message or the second message.

Advantageous Effects of Invention

An aspect of the present invention brings about an effect of preventing a plurality of output devices from outputting identical messages to a single user.

BRIEF DESCRIPTION OF DRAWINGS

FIG. 3 is a view illustrating a data structure of a message table that the server uses to determine a message.

DESCRIPTION OF EMBODIMENTS

Embodiment 1

Figure 1:
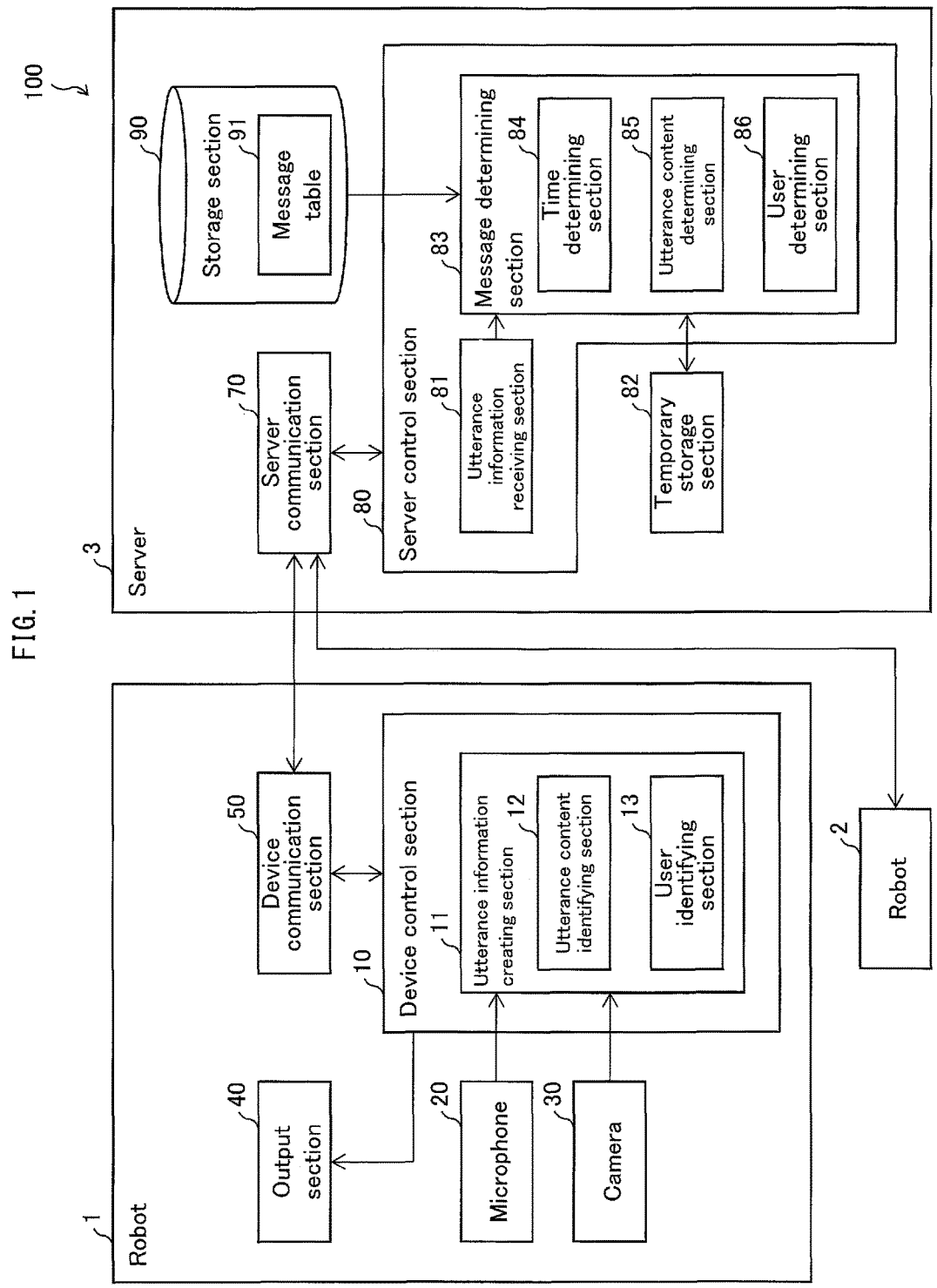
FIG. 1 is a block diagram illustrating each main configuration of robots and a server in accordance with Embodiment 1 of the present invention.
Figure 2:
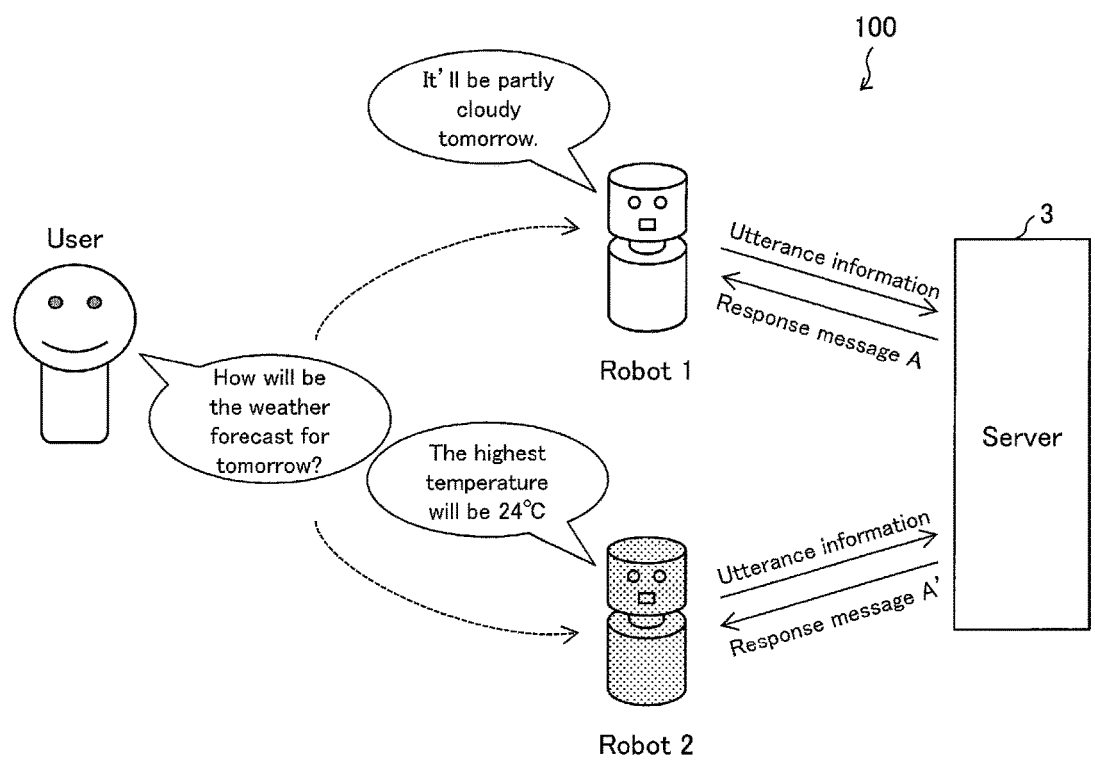
FIG. 2 is a schematic view illustrating a message output control system in accordance with Embodiment 1 of the present invention.

The following description will discuss Embodiment 1 of the present invention with reference to FIGS. 1 through 5. A message output control system 100 in accordance with Embodiment 1 will be first discussed below with reference to FIG. 2. FIG. 2 is a view schematically illustrating the message output control system 100 in accordance with Embodiment 1.

<<Outline of System>>

The message output control system 100 is a system in which a plurality of robots provide, to a user, respective response messages suited to a content (utterance content) of an utterance given by the user. As illustrated in FIG. 2, the message output control system 100 includes (i) robots (output device, first output device, second output device) 1 and 2 and (ii) a server (control device) 3. Embodiment 1 will discuss an example in which two robots are provided. Note, however, that the number of robots is not limited as such, provided that two or more robots are provided. The same applies to the following Embodiments.

Each of the robots 1 and 2 is a device having a function of interacting with the user by voices, detects an utterance given by the user, and then outputs (provides) a response message using voices, characters, and/or the like in response to such an utterance. The server 3 is a device that controls what the robots 1 and 2 should utter. According to the message output control system 100, in a case where the robots 1 and 2 detect an utterance given by the user, the robots 1 and 2 each transmit, to the server 3, corresponding utterance information (output information) that is used to determine a response message to be outputted in response to the utterance and is related to the utterance thus detected.

Upon receipt of the utterance information from the robot 1 or 2, the server 3 determines a response message corresponding to the utterance information, and then transmits the response message to a corresponding one of the robot 1 or 2. Specifically, in a case where the user gives to the robot 1 an utterance, for example, "How will be the weather forecast for tomorrow?", the robot 1 transmits, to the server 3, utterance information related to the utterance. In response to an utterance content "How will be the weather forecast for tomorrow?" indicated by the utterance information, the server 3 determines that the robot 1 should output a message A (sentence "It'll be partly cloudy tomorrow.") as a response message, and then transmits the message A to the robot 1. The robot 1 then outputs the message A thus received. That is, the robot 1 provides to the user "It'll be partly cloudy tomorrow."

In a case where the server 3 receives, from a plurality of robots, plural pieces of utterance information indicating identical messages, e.g., in a case where a plurality of robots detect an identical utterance given by the user, the server 3 transmits, to the respective plurality of robots, respective response messages that correspond to the utterance content of the user and are different from each other. This allows the plurality of robots not to output identical response messages to the user. For example, in a case where both of the robots 1 and 2 detect an utterance given by the user, the robots 1 and 2 transmit, to the server 3, respective plural pieces of utterance information related to the utterance given by the user. For example, in a case where the robot 2 detects, substantially concurrently with the robot 1, an utterance "How will be the weather forecast for tomorrow?" given by the user, there is a possibility that the robot 2 will transmit utterance information to the server 3 almost at the same time as the robot 1 will transmit utterance information to the server 3. In such a case, the server 3 controls (i) the robot 1 to output the message A and (ii) the robot 2 to output a message A', which is also a response message corresponding to the utterance content of the user and is different from the message A. For example, the robot 2 provides a message such as "The highest temperature will be 24° C.," which is different from a message to be provided by the robot 1. As such, in a case where a plurality of robots detect a single utterance, e.g., in a case where the user gives an utterance to a plurality of robots (or in the vicinity of a plurality of robots), the message output control system 100 can control the plurality of robots to output, to the user, respective different response messages.

<<Main Configurations of Robot and Server>>

Next, each internal configuration of the robots 1 and 2 and the server 3, which constitute the message output control system 100, will be discussed below with reference to FIG. 1. FIG. 1 is a block diagram illustrating each main configuration of the robots 1 and 2 and the server 3 in accordance with Embodiment 1. Note that in Embodiment 1, the robot 2 is identical to the robot 1 in internal main configuration, and descriptions and illustrations of the configuration of the robot 2 are thus omitted.

<<Main Configuration of Robots>>

The robot 1 includes a device control section 10, a microphone 20, a camera 30, an output section 40, and a device communication section 50. The microphone 20 acquires a voice signal by converting an utterance given by the user into voice data. The microphone 20 transmits a voice signal thus acquired to an utterance information creating section 11 (later described). The camera 30 captures an image of the user as a photographic subject. The camera 30 supplies a captured image (user's image) to the utterance information creating section 11 (later described). Note that in a case where the user identifying section 13 (later described) identifies the user based on data that is different from image data, the camera 30 is not necessarily provided. The output section 40 outputs a message received from the device control section 10. As the output section 40, for example, a speaker can be employed. The device communication section 50 transmits and receives data to/from the server 3.

The device control section 10 comprehensively controls the robot 1. Specifically, the device control section 10 transmits, to the server 3, utterance information created by the utterance information creating section 11 (later described). The device control section 10 also receives, from the server 3, a message to be outputted from the robot 1, and controls the output section 40 to output the message. More specifically, the device control section 10 includes the utterance information creating section 11, an utterance content identifying section 12, and the user identifying section 13. Though not illustrated in the drawings, the device control section 10 also includes a timer. The timer can be achieved by, for example, a real-time clock of the device control section 10.

The utterance information creating section 11 creates utterance information. Note that, in addition to creation of the utterance information, the utterance information creating section 11 can also transmit, to the server 3, a request for a response message. The utterance information creating section 11 includes the utterance content identifying section 12 and the user identifying section 13 so as to create various information to be included in the utterance information.

The utterance content identifying section 12 identifies an utterance content of the user, and creates information (utterance content information) indicating the utterance content. The utterance content information is not particularly limited in its form, provided that a message determining section 83 (later described) of the server 3 can identify a response message which varies depending on the utterance content indicated by the utterance content information. In Embodiment 1, the utterance content identifying section 12 identifies and extracts, as the utterance content information, one or more keywords from voice data of a voice uttered by the user. Alternatively, the utterance content identifying section 12 can employ, as the utterance content information, (i) voice data received from the microphone 20 or (ii) voice uttered by the user, which voice is extracted from the voice data.

The user identifying section 13 identifies the user who has uttered a voice. How to identify the user is not particularly limited. The user identifying section 13 identifies the user by, for example, (i) acquiring an image captured by the camera 30 and (ii) analyzing the image to identify the user who is photographed in the image. Alternatively, the user identifying section 13 can identify the user by analyzing a voiceprint contained in the voice data acquired by the microphone 20. By thus making an image analysis, making a voiceprint analysis, or other analysis, it is possible to accurately (with reasonable accuracy) identify the user who has uttered a voice.

The utterance information creating section 11 creates utterance information that contains (i) time at which the utterance information was created (utterance time information), (ii) the utterance content information created by the utterance content identifying section 12, and (iii) information (user identification information) indicating the user identified by the user identifying section 13. That is, the utterance information creating section 11 creates utterance information that contains information indicating "when (time) the voice was uttered, who (user identification information) uttered the voice, and what (utterance content) was uttered." The utterance information creating section 11 transmits the utterance information thus created to the server 3, via the device communication section 50.

<<Main Configuration of Server>>

The server 3 includes a server communication section 70, a server control section 80, a temporary storage section 82, and a storage section 90. The server communication section 70 transmits and receives data to/from the robots 1 and 2.

The temporary storage section 82 temporarily stores utterance information. Specifically, the temporary storage section 82 receives, from the message determining section 83, the utterance information and a response message that is determined in accordance with the utterance information, and then stores, for a given time period, (i) the utterance information and (ii) the response message so that the above (i) and (ii) are associated with each other. Note that the "given time period" is preferably not shorter than a time period in which the server 3 can receive, from another robot, utterance information that is based on the same utterance (i.e., a time lag caused by communication and processing in the robots 1 and 2).

The storage section 90 stores a message table 91 that is to be read out when the message determining section 83 (later described) carries out a process (message determining process) for determining a message.

A configuration of the message table will be described below with reference to FIG. 3.

<<Data Structure of Message Table>>

FIG. 3 is a view illustrating a data structure of the message table 91. Note that FIG. 3 illustrates an example in which the message table 91 is a data structure of table form. As such, the message table 91 is not limited to the data structure of a table form. The message table 91, which is illustrated by way of example in FIG. 3, contains an "UTTERANCE CONTENT" column, a "MESSAGE" column, and a "PRIORITY LEVEL" column. Information stored in the "MESSAGE" column is associated with information stored in the "UTTERANCE CONTENT" column. Information stored in the "PRIORITY LEVEL" column is associated with the information stored in the "MESSAGE" column.

The "UTTERANCE CONTENT" column stores information indicating an utterance content of the user. Specifically, the information stored in the "UTTERANCE CONTENT" column is stored in a form in which the message determining section 83 can compare that information with utterance content information contained in received utterance information. In a case where the utterance content information is, for example, a keyword extracted from an utterance given by the user, it is preferable to store, as data stored in the "UTTERANCE CONTENT" column, information indicating a keyword (or a combination of a plurality of keywords) indicating the utterance content. In a case where the utterance content information is voice data of the utterance given by the user, it is preferable to store, as the data in the "UTTERANCE CONTENT" column, voice data that can be compared with the voice data of the utterance given by the user.

The "MESSAGE" column stores information indicating response messages to be outputted from the robots 1 and 2. Note that, as illustrated in FIG. 3, the message table 91 is configured to associate a single piece of information, stored in the "UTTERANCE CONTENT" column, with a plurality of response messages.

The "PRIORITY LEVEL" column stores information indicating priority levels of respective response messages that are stored in the "MESSAGE" column and correspond to a single utterance content indicated in the "UTTERANCE CONTENT" column. Note that (i) how to establish the priority levels is not particularly limited and (ii) the information stored in the "PRIORITY LEVEL" column is not essential. In a case where the information stored in the "PRIORITY LEVEL" is not used, it is also possible to randomly select a single response message from response messages of a corresponding utterance content in the "UTTERANCE CONTENT" column.

The server control section 80 comprehensively controls the server 3, and includes an utterance information receiving section 81 and the message determining section (determining section, control section, message creating section) 83. The utterance information receiving section 81 acquires, via the server communication section 70, the utterance information transmitted from each of the robots 1 and 2. The utterance information receiving section 81 then transmits the utterance information thus acquired to the message determining section 83.

The message determining section 83 determines a response message. Specifically, upon receipt of the utterance information from the utterance information receiving section 81, the message determining section 83 reads out (i) another utterance information stored in the temporary storage section 82 (i.e., utterance information received prior to the above utterance information having been received) and (ii) response messages associated with the another utterance information. Note that in the following description, the utterance information received by the utterance information receiving section 81, i.e., the utterance information which the server 3 is about to determine a response message will be referred to as "target utterance information." The message determining section 83 then detects, from the another utterance information, utterance information that corresponds to an utterance to which the target utterance information also corresponds. In order to detect such utterance information, the message determining section 83 includes a time determining section 84, an utterance content determining section 85, and the user determining section 86.

The time determining section 84 determines whether or not a difference between (i) time contained in the another utterance information and (ii) time contained in the target utterance information falls within a given range. Note that, in order to improve an accuracy of the determination, the time determining section 84 can (i) measure not only the time contained in the utterance information but also time at which the server 3 received the utterance information and (ii) store them together with the utterance information. In doing so, the time determining section 84 can determine whether or not a difference, between (i) time at which the target utterance information was received and (ii) time at which the another utterance information was received, falls within a given range. This makes it possible to accurately compare the time even in a case where, for example, there is a time lag between time measured by the robot 1 and time measured by the robot 2. The utterance content determining section 85 determines whether or not utterance content information contained in the another utterance information matches utterance content information contained in the target utterance information. The user determining section 86 determines whether or not user identification information contained in the target utterance information matches user identification information contained in the another utterance information.

Based on determination results of the time determining section 84, the utterance content determining section 85, and the user determining section 86, the message determining section 83 detects another utterance information that (i) satisfies the time lag between time contained in the target utterance information and time contained in the another utterance information falling within a given range and (ii) matches the target utterance information in utterance content and in user identification information. Note that in the following description, the another utterance information to be detected by the message determining section 83 will be referred to as a detection target utterance information. The detection target utterance information is presumed to be utterance information created in a case where a plurality of robots have detected, almost at the same time, an utterance given by a single user. In other words, the detection target utterance information is presumed to be utterance information created in response to the same utterance as that of the target utterance information. The message determining section 83 then identifies, by referring to the message table 91 stored in the storage section 90, a response message corresponding to the target utterance information.

During identification of the response message, the message determining section 83 identifies a response message so that the response message for the target utterance information is different from a response message for the detection target utterance information. Specifically, the message determining section 83 identifies, out of response messages corresponding to the utterance content information contained in the target utterance information, a response message that (i) is different from the response message for the detection target utterance information and (ii) is of the highest priority level. Note that in a case where there is no detection target utterance information, the message determining section 83 identifies a response message of the highest priority level, out of the response messages corresponding to the utterance content information contained in the target utterance information. The message determining section 83 then stores, in the temporary storage section 82, the target utterance information and the response message thus identified so that the target utterance information and the response message are associated with each other.

Note that in a case where, after determination of the response message for the target utterance information, the message determining section 83 detects, by referring to the temporary storage section 82, another utterance information for which a response message identical to the response message for the target utterance information has been identified, the message determining section 83 can change the response message thus determined to another response message. This configuration can also prevent a plurality of robots from outputting identical response messages. Note that, with this configuration, it is also possible to change the response message thus determined to another response message, in a case where the another utterance information thus detected matches the target utterance information, as a result of making determination processes of the time determining section 84, the utterance content determining section 85, and the user determining section 86.

<<Flow of Data Communication Between Devices>>

Figure 4:
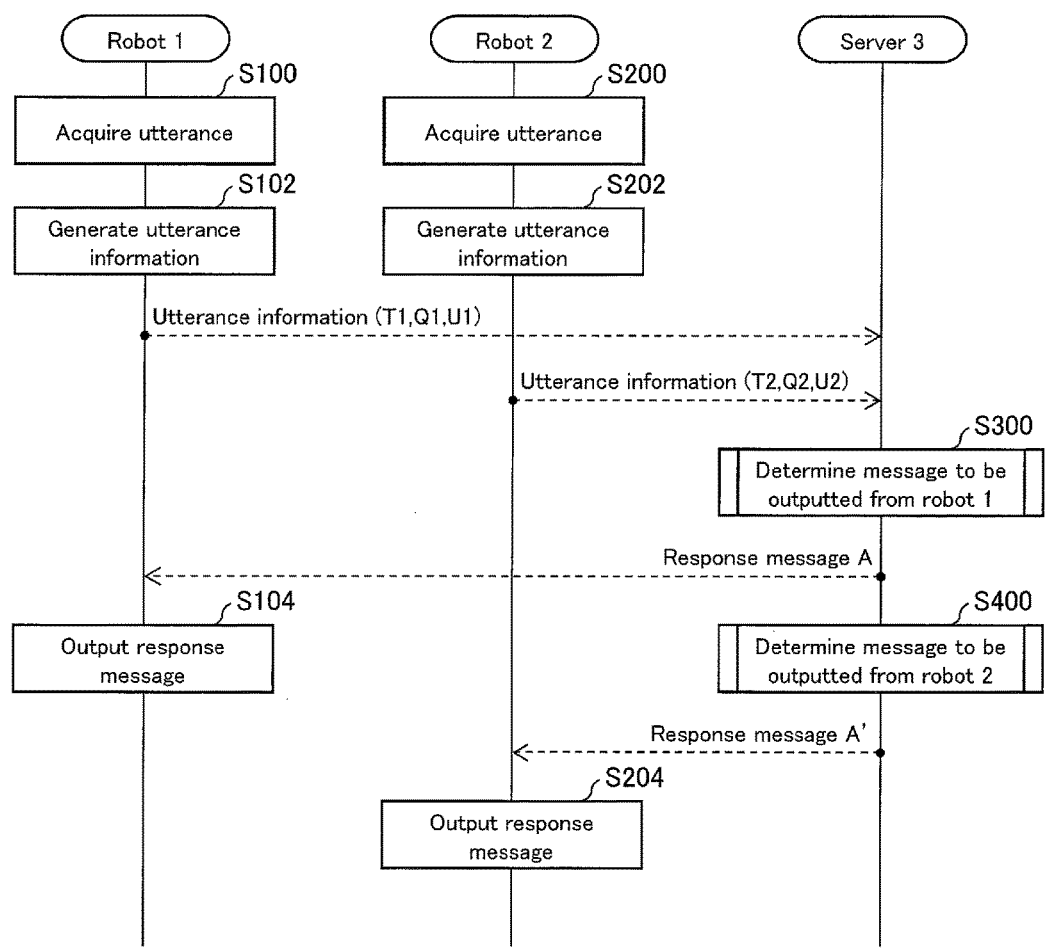
FIG. 4 is a sequence diagram illustrating, in a chronological order, a flow of information between the robots and the server.

How the robots 1 and 2 and the server 3 exchange data will be described below with reference to FIG. 4. FIG. 4 is a sequence diagram illustrating, in a chronological order, how the robots 1 and 2 and the server 3 exchange data. Note that subroutines indicated by S300 and S400 of FIG. 4 each refer to a series of message determining processes (S302 through S310) illustrated in FIG. 5. In the following description, utterance information containing T1, Q1, and U1 will be referred to as utterance information (T1, Q1, U1), where T1, Q1, and U1 indicate time, utterance content information, and user identification information, respectively, and are contained in utterance information created by the robot 1. Similarly, utterance information containing T2, Q2, and U2 will be referred to as utterance information (T2, Q2, U2), where T2, Q2, and U2 indicate time, utterance content information, and user identification information, respectively, and are contained in utterance information created by the robot 2.

In a case where a user gives an utterance, each of the robots 1 and 2 acquires the utterance through the microphone 20, and transmits the utterance thus acquired to the utterance information creating section 11 (S100 and S200). At the same time, the camera 30 captures an image of the user who has given the utterance, and the image thus captured is transmitted to the utterance information creating section 11. The utterance content identifying section 12 of the utterance information creating section 11 then identifies, based on voice data, a keyword contained in the utterance given by the user. The user identifying section 13 identifies the user based on the image. The utterance information creating section 11 then creates utterance information (S102 and S202) containing (i) measured time (time at which utterance information was created), (ii) utterance content information, and (iii) user identification information, and transmits the utterance information to the server 3. Upon receipt of the utterance information (T1, Q1, U1) from the robot 1, the server 3 carries out the message determining process (S300). Note here that, as illustrated in FIG. 4, (i) the utterance information created by the robot 1 is utterance information that the server 3 received first (utterance information that is received while no other utterance information is being stored in the temporary storage section 82 of the server 3) and (ii) the utterance information (T1, Q1, U1) is the target utterance information. It follows that there is no detection target utterance information, and the message determining section 83 determines that, out of response messages corresponding to Q1, a response message of the highest priority level is to be outputted from the robot 1. The server 3 then transmits a message A thus determined to the robot 1. Upon receipt of the message A, the robot 1 outputs the message A through the output section 40 (S104).

Subsequently, the server 3 carries out the message determining process with respect to utterance information (T2, Q2, U2) received from the robot 2 (S400). The message determining process has already been carried out with respect to the utterance information (T1, Q1, U1) received from the robot 1 as described above. As such, another utterance information (utterance information (T1, Q1, U1)) has already been stored in the temporary storage section 82 of the server 3. The utterance information (T2, Q2, U2) is employed as the target utterance information. The message determining section 83 therefore determines, via the time determining section 84, the utterance content determining section 85, and the user determining section 86, whether or not the target utterance information (T2, Q2, U2) matches the another utterance information (T1, Q1, U1). In a case where the target utterance information (T2, Q2, U2) is determined to match the another utterance information (T1, Q1, U1), the utterance information (T1, Q1, U1) is employed as the detection target utterance information. In such a case, the server 3 determines a message A', which is different from the response message A corresponding to the utterance information (T1, Q1, U1), and transmits the message A' to the robot 2. In contrast, in a case where the utterance information (T1, Q1, U1) is not the detection target utterance information, the server 3 determines a message A' in accordance with Q2 regardless of the response message A, and transmits the message A' to the robot 2. Upon receipt of the message A', the robot 2 outputs the message A' through the output section 40 (S204).

<<Message Determining Process>>

Figure 5:
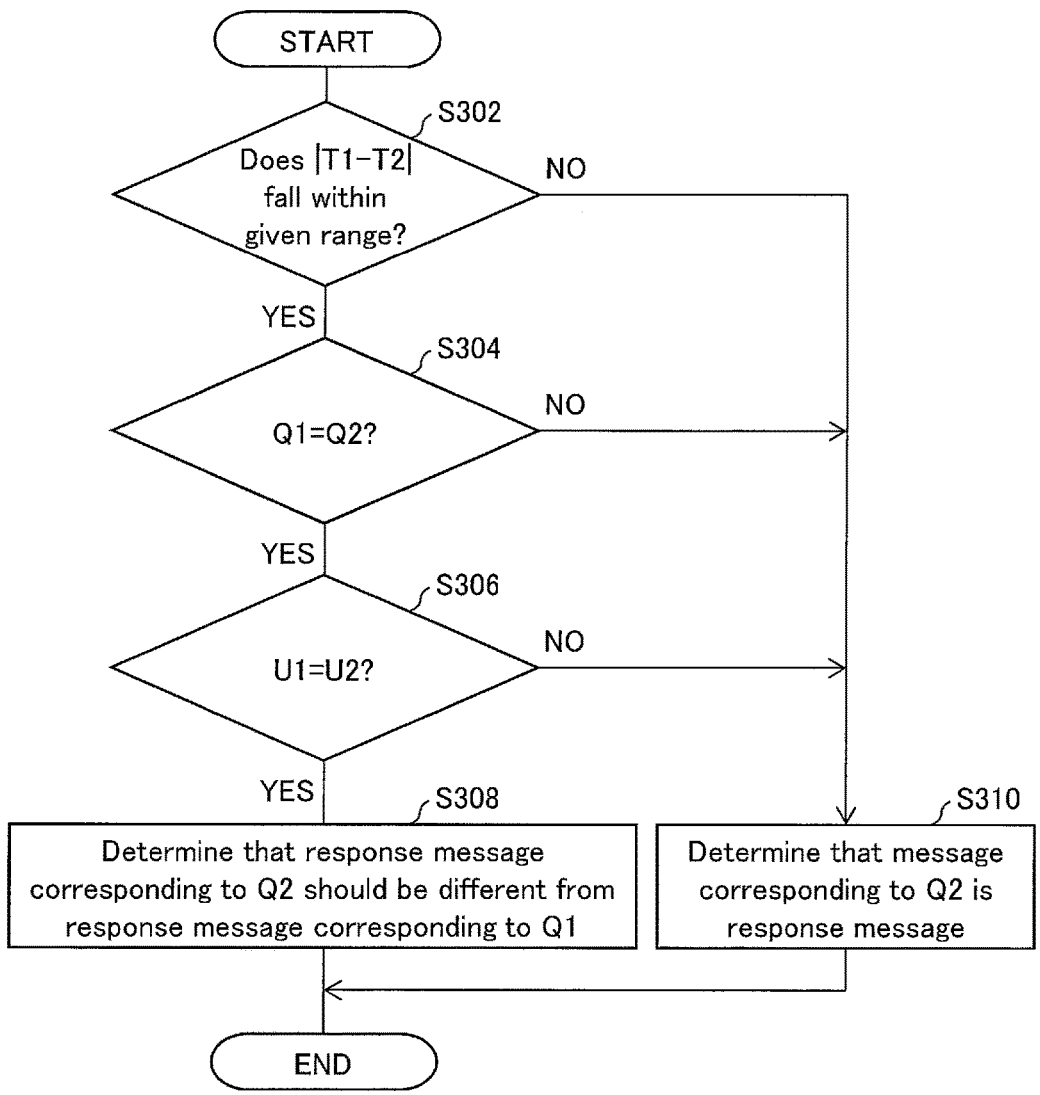
FIG. 5 is a flowchart illustrating a message determining process to be carried out by the server.

Next, a flow of a process (message determining process), in which the message determining section 83 determines a message, will be described below in detail with reference to FIG. 5. Note that the following description will discuss, by way of example, a message determining process (S400) in which a response message to be outputted by the robot 2 illustrated in FIG. 4 is determined. FIG. 5 is a flowchart illustrating the message determining process. Note that orders of respective steps S302 through S306 illustrated in FIG. 5 can be changed.

Upon receipt of the utterance information (T2, Q2, U2), the message determining section 83 proceeds with the steps S302 though S306 to detect, out of another utterance information, utterance information that corresponds to an utterance to which the target utterance information (in this example, T2, Q2, U2) also corresponds. Specifically, the time determining section 84 of the message determining section 83 determines whether or not a difference between time T2 contained in the target utterance information (T2, Q2, U2) and time T1 contained in the another utterance information (in this example, T1, Q1, U1) falls within a given range (S302). In a case where the difference between T2 and T1 falls within a given range (YES in S302), the utterance content determining section 85 then determines whether or not Q2 matches Q1 (S304). In a case where Q2 matches Q1 (YES in S304), the user determining section 86 then determines whether or not U2 matches U1 (S306). In a case where U2 matches U1 (YES in S306), the message determining section 83 employs the another utterance information (T1, Q1, U1) as utterance information (detection target utterance information) that is based on an utterance on which the target utterance information (T2, Q2, U2) is also based.

The message determining section 83 then determines a message corresponding to Q2. Specifically, the message determining section 83 compares the "UTTERANCE CONTENT" column of the message table 91 with an utterance content indicated by Q2, so as to identify a response message corresponding to Q2. In so doing, the message determining section 83 determines, as a message to be outputted from a robot that has sent the target utterance information, a response message corresponding to the detection target utterance information (T1, Q1, U1), i.e., a message of the highest priority out of messages different from the response messages corresponding to Q1 (S308).

In contrast, in a case where (i) the difference between T2 and T1 does not fall within a given range, (ii) Q2 does not match Q1, or (iii) U2 does not match U1 (i.e., NO in any one of S302 through S306), the message determining section 83 determines that there is no detection target utterance information. Note that, in a case where two or more pieces of another utterance information are stored, the steps S302 through S306 are to be proceeded with for each of the two or more pieces of another utterance information. The message determining section 83 identifies, by referring to the message table 91, as a response message to be outputted from a robot that has sent the target utterance information, a response message of the highest priority level out of response messages corresponding to the target utterance information (S310).

Embodiment 2

Alternatively, a robot can also be arranged to voluntarily output a message to the user, instead of providing a response message in response to an utterance given by the user. The following description will discuss Embodiment 2 of the present invention with reference to FIG. 6. Hereinafter, a message that a robot voluntarily outputs (utters) will be referred to as a "voluntary message".

Figure 6:
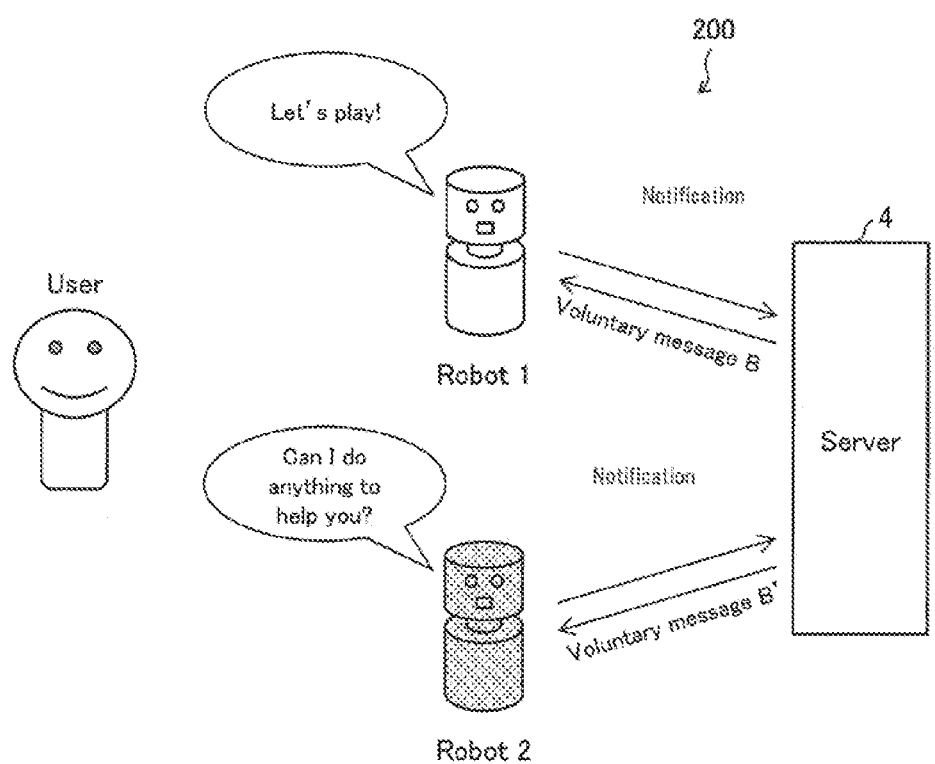
FIG. 6 is a view illustrating an outline of a message output control system in accordance with Embodiment 2 of the present invention.

FIG. 6 is a view illustrating an outline of a message output control system 200 in accordance with Embodiment 2. As with the case of the message output control system 100, the message output control system 200 includes a plurality of robots (robots (output devices) 1 and 2) and a server (control device) 4. The server 4 has a structure similar to that of the server 3 (see FIG. 1). The server 4, however, is different from the server 3 in that it controls the robots 1 and 2 to output respective voluntary messages in response to a preset event (condition). Note that the "preset event (condition)" is not particularly limited. The following description will discuss an example in which the robots 1 and 2 are controlled to output respective voluntary messages, upon detection of proximity of the user (i.e., in a case where the user enters a detection range of a robot).

In a case where the user enters a detection range of the robot 1 or 2, the robot 1 or 2 sends to the server 4 a notification of the user having entered the detection range. Upon receipt of the notification, the server 4 determines a voluntary message, and transmits the voluntary message to the robot 1 or 2 that has sent the notification. For example, in a case where the server 4 receives such a notification from the robot 1, the server 4 determines that a voluntary message B (sentence "Let's play!") is a voluntary message to be outputted from the robot 1, and controls the robot 1 to output the voluntary message B.

In a case where the robot 2 is near the robot 1 when the user has come close to the robot 1, the robot 2 also detects a proximity of the user, and sends to the server 4 a notification of the user having entered its detection range. In such a case, the server 4 determines a voluntary message to be outputted from the robot 2 so that the robot 2 does not output a voluntary message identical to the voluntary message to be outputted from the robot 1. For example, the server 4 determines that a voluntary message B' (sentence "Can I do anything to help you?"), which is different from the voluntary message B, is the voluntary message to be outputted from the robot 2, and controls the robot 2 to output such a voluntary message B'. As such, the message output control system 200 can prevent a plurality of robots from outputting identical voluntary messages to a single user at the same timing.

Embodiment 3

Embodiments 1 and 2 each have discussed an example in which a message is provided to a user via an utterance using voice. However, provision of a message is not particularly limited to as such, provided that the user can recognize such a message. The message can be provided also by, for example, registering a message for the user on an electronic medium such as an electronic display board. In such a case, the server 3 or 4 can register the message on behalf of the robots 1 and 2 (under names of the robots 1 and 2).

Embodiments 1 and 2 have discussed an example in which the server 3 creates a response message with respect to an utterance using voice given by the user. However, the server 3 can alternatively create a message in accordance with information which is written (posted) into an electronic medium by the user. Assume a case where, for example, the server 3 is to post a message of the robot 1 or 2 on a comment posted on a microblogging site by the user. In a case where the server 3 has determined that messages of the robots 1 and 2 are identical to each other, the server 3 can control the robots 1 and 2 to post, for example, (i) a message of one of the robots 1 and 2 or (ii) messages which are different from each other. This allows identical messages to be prevented from being posted on a single comment. Note that posting of a message of each robot is not limited to on the user's posting. As such, such posting can be carried out, for example, in a case where a given condition is satisfied (e.g., when a preset date or time has come).

[Variation]

In the message output control systems 100 and 200 of Embodiments 1 through 3, one server (server 3 or 4) functions as determining a message, controlling outputting of the robots, and the like. However, such functions can alternatively be separately carried out by the respective servers. The functions of the message output control systems 100 and 200 can be also carried out by, for example, a combination of (i) a message determining server that determines a response message (or a voluntary message) to be outputted from the robot 1 or 2 and (ii) an output control server that controls the robot 1 or 2 to output the message thus determined by the message determining server.

The user identifying section 13 can alternatively identify, based on positional information of the robot 1, a user who has given an utterance to the robot 1. For example, in a case where the positional information of the robot 1 indicates that the robot 1 is in a room of a certain user, the user identifying section 13 can identify such a certain user as the user who has given an utterance to the robot 1. Note that the positional information can be acquired by use of a Global Positioning System (GPS). In a case where receiving sensitivity is low for example in a room, it is possible to compensate the positional information by use of a wireless communication function of the robot 1. Alternatively, it is possible to identify a position of the robot 1 by use of, for example, (i) an Indoor MEssaging System (IMES) function or (ii) an image captured by the camera 30.

In the message output control system 100, the robots 1 and 2 can alternatively employ, as the utterance content information, voice data per se acquired by the microphone 20, instead of identifying an utterance content by the utterance content identifying section 12. In such a case, the server 3 may extract a keyword that indicates an utterance content. In such a case, the user can be alternatively identified by the server 3 carrying out a voiceprint verification with respect to the voice data. This makes it unnecessary for the robots 1 and 2 to transmit the user identification information.

In a case where the server 3 receives utterance information from the robots 1 and 2, the server 3 can alternatively wait for a given time period after receiving utterance information from one of the robots 1 and 2, instead of carrying out the message determining process on a first-come first-served basis. In a case where the server 3 receives utterance information from the other one of the robots 1 and 2 while waiting, the server 3 can carry out, in a predetermined order or randomly, the message determining process for each piece of the utterance information thus received. More specifically, the server 3 can (i) carry out the message determining process in an order corresponding to priority levels set for robots that have transmitted respective plural pieces of utterance information or (ii) determine, in accordance with contents of information (e.g., identification accuracy of utterance content) contained in the utterance information, an order of carrying out the message determining process, i.e., an order of allocating messages of higher priority levels.

Embodiments 1 through 3 each have dealt with an example in which the robots are controlled to output respective different messages. An alternative configuration can be employed in which one of robots is controlled not to output a message (not to transmit a message). With such an alternative configuration, it is still possible to prevent a plurality of robots from outputting identical messages.

[Software Implementation Example]

The robots 1 and 2, the server 3, and control blocks of the server 4 (particularly, the utterance information creating section 11 and the message determining section 83) can be realized by a logic circuit (hardware) provided in an integrated circuit (IC chip) or the like or can be alternatively realized by software as executed by a central processing unit (CPU).

In the latter case, each of the robots 1 and 2 and the server 3 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

A control device (servers 3 and 4) in accordance with a first aspect of the present invention controls a plurality of output devices (robots 1 and 2) to output messages (response messages or voluntary messages), the plurality of output devices including a first output device and a second output device, the control device including: a determining section (message determining section 83) that determines whether or not a message to be outputted from the first output device is identical to a first message to be outputted from the second output device or a second message which has been outputted from the second output device; and a control section (message determining section 83) that controls the first output device to (i) output a message different from the first message or the second message or (ii) not output any message, in a case where the determining section has determined that the message to be outputted from the first output device is identical to the first message or the second message.

With the above configuration, in a case where a message to be outputted from the first output device is identical to a message to be outputted from the second output device or a message which has been outputted by the second output device, the control device can control the first output device not to output the message identical to that of the second output device. The control device is therefore able to prevent a plurality of output device from outputting identical messages.

In a second aspect of the present invention, a control device can be arranged to further include, in the first aspect of the present invention, a message creating section (message determining section 83) that (i) receives, from the first and second output devices, pieces of utterance content information indicating utterance contents of an utterance that a user has given to the first and second output devices and (ii) creates messages for the respective pieces of the utterance content information, the determining section determining that the message to be outputted from the first output device is identical to the first message or the second message, in a case where the pieces of utterance content information received from the respective first and second output devices correspond to identical utterances.

With the above configuration, the control device can control the output devices not to output identical messages in a case where respective pieces of utterance content information received from the first output device and the second output device correspond to identical utterances. This makes it possible to prevent a plurality of output devices, which have detected identical utterances and are to respond to (output messages for) the identical utterances, from outputting identical messages.

In a third aspect of the present invention, a control device can be arranged such that, in the second aspect of the present invention, the determining section acquires, from the first and second output devices, respective pieces of user identification information indicating users who have given the utterance to the first and second output devices; and the determining section determines that the pieces of utterance content information correspond to identical utterances, in a case where the utterance contents indicated by the respective pieces of utterance content information match each other and the users indicated by the pieces of user identification information are identical.

With the above configuration, in a case where the first output device is to output a message for the same utterance content of a single user which utterance content has been detected by the second output device, the control device can control the first control device not to output a message identical to that of the second output device. The control device is therefore able to prevent a plurality of output devices from providing identical sentences to the same utterance content given by a single user.

In a fourth aspect of the present invention, a control device can be arranged such that, in the second or third aspect of the present invention, the determining section acquires, from the first and second output devices, respective pieces of utterance time information indicating times at which the user(s) has given the utterance to the first and second output devices; and the determining section determines that the pieces of utterance content information correspond to the identical utterances, in a case where (i) the utterance contents indicated by the respective pieces of utterance content information match each other and (ii) a difference in times indicated by the respective pieces of utterance time information falls within a given range.

The "given range" is desirably set within a range in which time at which a user has given an utterance can be presumed to be identical in view of period of time between processing and communication of the respective output devices. The "time at which the user has given the utterance" desirably roughly matches actual time at which the user has given the utterance, and does not need to exactly match the actual time. For example, it is possible to employ, as the "time at which the user has given the utterance", (i) time at which each of the output devices has detected the utterance given by the user or (ii) time at which the control device has received the respective pieces of utterance content information. In the former case, the control device desirably acquires the utterance time information from the output devices. In the latter case, the control device can determine receipt time by use of a timer provided therein.

With the above configuration, in a case where the first output device and the second output device are to output messages for utterances that were given at the same time (at the same timing), the control device can control the output devices not to output identical messages. The control device is therefore able to prevent a plurality of output devices from providing identical sentences to the same utterance content of a single user.

A message output control system (message output control systems 100 and 200) in accordance with a fifth aspect of the present invention includes: the control device (servers 3 and 4) of any one of the first through fourth aspects; and the plurality of output devices of any one of the first through fourth aspects.

The control device and the output device in accordance with the foregoing embodiments of the present invention may be realized by a computer. In such a case, the present invention encompasses a control program for the control device or the output device which program causes a computer to operate as the foregoing means of the control device or the output device so that the control device or the output device can be realized by the computer; and a computer-readable storing storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is suitably applicable to, for example, an output device that provides a message to a user and a control device that determines a message to be outputted by the output device.

REFERENCE SIGNS LIST 1, 2 Robot (output device, first output device, second output device)
3 Server (control device)
83 Message determining section (determining section, control section, message creating section)
100, 200 Message output control system

The invention claimed is:

1. A control device that controls a plurality of output devices to output messages, the plurality of output devices including a first output device and a second output device, the control device comprising:
one or more processors; and
a memory associated with the one or more processors; wherein the one or more processors executes instructions stored on the memory to include:
a determining section that determines whether or not a message to be outputted from the first output device is identical to a first message to be outputted from the second output device or a second message which has been outputted from the second output device; and
a control section that controls the first output device to (i) output a message different from the first message or the second message or (ii) not output any message, in a case where the determining section has determined that the message to be outputted from the first output device is identical to the first message or the second message;

wherein the processor executes instructions stored on the memory to include:

a message creating section that (i) receives, from the first and second output devices; pieces of utterance content information indicating utterance contents of an utterance that a user has given to the first and second output devices and (ii) creates messages for the respective pieces of the utterance content information;

the determining section determining that the message to be outputted from the first output device is identical to the first message or the second message, in a case where the pieces of utterance content information received from the respective first and second output devices correspond to identical utterances.

2. The control device as set forth in claim 1, wherein:

the determining section acquires, from the first and second output devices, respective pieces of user identification information indicating users who have given the utterance to the first and second output devices; and the determining section determines that the pieces of utterance content information correspond to identical utterances, in a case where the utterance contents indicated by the respective pieces of utterance content information match each other and the users indicated by the pieces of user identification information are identical.

3. The control device as set forth in claim 1, wherein:

the determining section acquires, from the first and second output devices, respective pieces of utterance time information indicating times at which the user(s) has given the utterance to the first and second output devices; and the determining section determines that the pieces of utterance content information correspond to the identical utterances, in a case where (i) the utterance contents indicated by the respective pieces of utterance content information match each other and (ii) a difference in times indicated by the respective pieces of utterance time information falls within a given range.

4. A message output control system comprising:

a plurality of output devices including a first output device and a second output device; and a control device recited in claim 1.

* * * * *